(12) United States Patent
Shin et al.

(10) Patent No.: US 10,115,224 B2
(45) Date of Patent: Oct. 30, 2018

(54) METHOD AND APPARATUS GENERATING ACCELERATION STRUCTURE

(71) Applicant: Samsung Electronics Co., Ltd., Suwon-si (KR)

(72) Inventors: Youngsam Shin, Hwaseong-si (KR); Wonjong Lee, Seoul (KR); Seokjoong Hwang, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/334,815

(22) Filed: Oct. 26, 2016

(65) Prior Publication Data
US 2017/0116774 A1    Apr. 27, 2017

(30) Foreign Application Priority Data
Oct. 26, 2015 (KR) .................. 10-2015-0148826

(51) Int. Cl.
G06T 15/06 (2011.01)
G06T 15/50 (2011.01)

(52) U.S. Cl.
CPC .............. *G06T 15/06* (2013.01); *G06T 15/50* (2013.01); *G06T 2210/21* (2013.01)

(58) Field of Classification Search
CPC ..................................................... G06T 15/06
See application file for complete search history.

(56) References Cited

U.S. PATENT DOCUMENTS

| 8,072,460 B2 | 12/2011 | Lauterbach et al. |
| 2013/0033507 A1* | 2/2013 | Garanzha ............... G06T 15/06 345/522 |
| 2013/0235049 A1* | 9/2013 | Karras ..................... G06T 1/20 345/505 |

(Continued)

FOREIGN PATENT DOCUMENTS

KR    10-2015-0046643 A    4/2015

OTHER PUBLICATIONS

Lauterbach, C. et al., "Fast BVH construction on GPUs," Blackwell Publishing Ltd., Computer Graphics Forum, vol. 28, No. 2, 2009 (10 pages).

*Primary Examiner* — Daniel Hajnik
(74) *Attorney, Agent, or Firm* — F. Chau & Associates, LLC

(57) ABSTRACT

A method of generating a ray tracing acceleration structure includes transformatively mapping locations of object primitives in a three dimensional first space into Morton codes indicating respective locations of the primitives along a meandering linear path through the first space; determining a Morton distance indicating a difference between a first Morton code corresponding with a first primitive and a second Morton code corresponding with a second primitive; generating an acceleration structure to include nodes representing portions of the first space and adaptively adjusting a reference level of the acceleration structure, based on the Morton distance between primitives; and dividing the first space using a first division method when a level of a first node of the acceleration structure which corresponds to the first space is lower than the reference level, and dividing the first space using a second division method when the level of the first node exceeds the reference level.

20 Claims, 12 Drawing Sheets

(56) References Cited

U.S. PATENT DOCUMENTS

| | | | |
|---|---|---|---|
| 2013/0235050 A1* | 9/2013 | Karras | G06T 1/20 345/505 |
| 2014/0340412 A1 | 11/2014 | Doyle et al. | |
| 2015/0109292 A1 | 4/2015 | Lee et al. | |
| 2016/0139931 A1* | 5/2016 | Evans | G06F 9/30098 712/208 |

* cited by examiner

METHOD AND APPARATUS GENERATING ACCELERATION STRUCTURE

CROSS-REFERENCE TO RELATED APPLICATIONS

This application claims the benefit under 35 USC § 119(a) of Korean Patent Application No. 10-2015-0148826, filed on Oct. 26, 2015, in the Korean Intellectual Property Office, the entire disclosure of which is incorporated herein by reference for all purposes.

BACKGROUND

1. Field

The present disclosure relates to a method and apparatus generating an acceleration structure for ray tracing.

2. Description of Related Art

Three-dimensional (3D) rendering is an image processing procedure of synthesizing 3D object data into an image seen from a view point of a camera. Ray tracing is a process of tracing intersection points where rays intersect scene objects that are rendering targets. Ray tracing includes a traversal process of traversing an acceleration structure and a process of conducting an intersection test between a ray and a primitive. A generally large degree of computational resources such as processing time and power and a large memory bandwidth are required for the traversal process and process of conducting the intersection test.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a general aspect, a method of generating an acceleration structure for ray tracing includes obtaining Morton codes indicating respective locations of primitives comprised in a first space; calculating a Morton distance indicating a difference between a first Morton code corresponding with a first primitive and a second Morton code corresponding with a second primitive; adjusting a reference level of the acceleration structure, based on the Morton distance; and dividing the first space using a first division method in response to a level of a first node of the acceleration structure which corresponds to the first space being lower than the reference level, and dividing the first space using a second division method in response to the level of the first node exceeding the reference level.

The first division method may include a surface area heuristic (SAH) method, and the second division method may include a division method using the Morton codes.

When the level of the first node exceeds the reference level, the dividing of the first space may include dividing spaces respectively corresponding to sub-nodes included in the first node by using the Morton codes.

The method may further include obtaining sub-spaces comprising the first space by dividing a second space by using the SAH method.

The first primitive may be a primitive having a smallest Morton code, and the second primitive may be a primitive having a greatest Morton code.

The adjusting of the reference level may include decreasing the reference level when the Morton distance is less than a certain threshold value and increasing the reference level when the Morton distance is equal to or greater than the certain threshold value.

According to another general aspect, a method of generating an acceleration structure for ray tracing includes obtaining Morton codes indicating locations of primitives comprised in a first space; calculating a Morton distance indicating a difference between a first Morton code corresponding with a first primitive and a second Morton code corresponding with a second primitive; dividing the first space into sub-spaces by using a first division method in response to the Morton distance being less than a certain threshold value and dividing the first space into the sub-spaces by using a second division method in response to the Morton distance exceeding the certain threshold value; and generating the acceleration structure by setting each of the sub-spaces as a node comprised in the acceleration structure.

According to another general aspect, an apparatus for generating an acceleration structure for ray tracing includes a memory configured to store information about the acceleration structure; and a processor configured to obtain Morton codes indicating locations of primitives comprised in a first space, calculate a Morton distance indicating a difference between a first Morton code corresponding to a first primitive from among the primitives comprised in the first space and a second Morton code corresponding to a second primitive from among the primitives, adjust a reference level of the acceleration structure based on the Morton distance, and divide the first space by using a first division method in response to a level of a first node of the acceleration structure that corresponds to the first space being lower than the reference level, or divide the first space by using a second division method in response to the level of the first node exceeding the reference level.

The processor may be further configured to divide spaces respectively corresponding to sub-nodes comprised in the first node by using the Morton codes when the level of the first node exceeds the reference level.

The processor may be further configured to obtain sub-spaces comprising the first space by dividing a second space by using the SAH method.

The processor may be further configured to decrease the reference level of the acceleration structure when the Morton distance is less than a certain threshold value and increase the reference level when Morton distance is equal to or greater than the certain threshold value.

According to another general aspect, an apparatus for generating a ray tracing acceleration structure includes a memory configured to store information about the acceleration structure; and a processor configured to transformatively map locations of object primitives in a three dimensional first space into Morton codes indicating locations of the primitives along a meandering linear path through the first space, to determine a Morton distance indicating a difference between a first Morton code corresponding to a first primitive from among the primitives comprised in the first space and a second Morton code corresponding to a second primitive from among the primitives, to divide the first space into sub-spaces by using a first division method when the Morton distance is less than a certain threshold value, divide the first space into sub-spaces by using a second division method when the Morton distance exceeds the certain threshold value, and to generate the acceleration structure by setting each sub-space as a node in the acceleration structure.

A non-transitory computer-readable recording medium may have embodied thereon a computer program which, when executed by a computer, performs the method.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
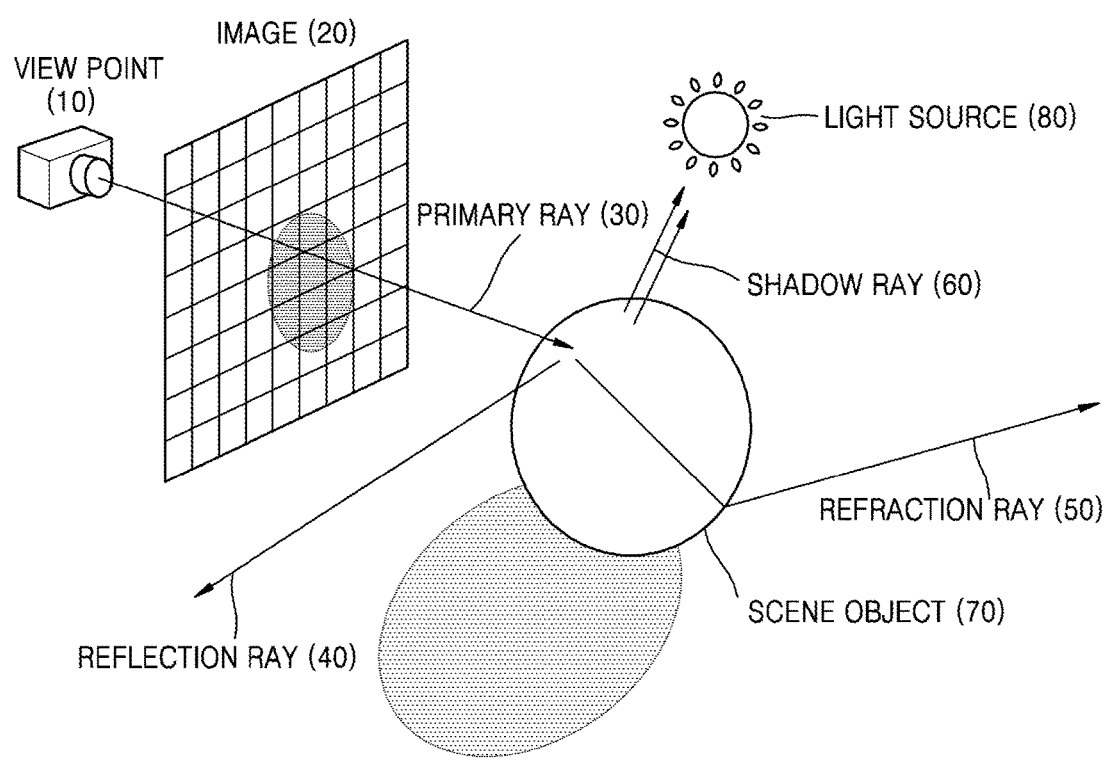
FIG. 1 illustrates ray tracing according to one or more embodiments.

The following detailed description is provided to assist the reader in gaining a comprehensive understanding of the method and apparatus described herein. However, after an understanding of the present disclosure, various changes, modifications, and equivalents of the method and apparatus described herein may then be apparent to one of ordinary skill in the art. The sequences of operations described herein are merely non-limiting examples, and are not limited to those set forth herein, but may be changed, as will be apparent to one of ordinary skill in the art, with the exception of operations necessarily occurring in a certain order, after an understanding of the present disclosure. Also, descriptions of functions and constructions that may be understood, after an understanding of differing aspects of the present disclosure, may be omitted in some descriptions for increased clarity and conciseness.

Various alterations and modifications may be made to embodiments, some of which will be illustrated in detail in the drawings and detailed description. However, it should be understood that these embodiments are not construed as limited to the disclosure and illustrated forms and should be understood to include all changes, equivalents, and alternatives within the idea and the technical scope of this disclosure.

Terms used herein are to merely explain specific embodiments, thus they are not meant to be limiting. A singular expression includes a plural expression except when two expressions are contextually different from each other. For example, as used herein, the singular forms "a", "an", and "the" are intended to include the plural forms as well, unless the context clearly indicates otherwise. Herein, a term "include" or "have" are also intended to indicate that characteristics, figures, operations, components, or elements disclosed in the specification or combinations thereof exist. The term "include" or "have" should be understood so as not to preclude existence of one or more other characteristics, figures, operations, components, elements or combinations thereof. In addition, though terms such as first, second, A, B, (a), (b), and the like may be used herein to describe components, unless indicated otherwise, these terminologies are not used to define an essence, order, or sequence of a corresponding component but used merely to distinguish the corresponding component from other component(s) for clarity purposes. Furthermore, any recitation of ranges of values herein are merely intended to serve as a shorthand method of referring individually to each separate value falling within the range, unless otherwise indicated herein, and each separate value is incorporated into the specification as if it were individually recited herein.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 illustrates ray tracing according to one or more embodiments. Referring to FIG. 1, in 3-dimensional (3D) modeling, a ray tracing core determines a view point 10 and determines an image 20 according to the view point 10. After the view point 10 and the image 20 are determined, the ray tracing core generates rays for pixels of the image 20 from the view point 10.

A primary ray 30 is generated from the view point 10. The primary ray 30 passes through the image 20 and then intersects a scene object 70. A reflection ray 40 and a refraction ray 50 are generated at an intersection point where the primary ray 30 intersects the scene object 70. Also, a shadow ray 60 is generated in a direction toward a light source 80 from the intersection point. The reflection, refraction, and shadow rays 40, 50, and 60 are referred to as secondary rays. The scene object 70 is an object to be rendered on the image 20. The scene object 70 includes primitives. Primitives may be unit portions or sub-divisions of an object.

The ray tracing core/s 100 analyzes the primary ray 30, the secondary rays 40, 50, and 60, and rays derived from the secondary rays 40, 50, and 60. The ray tracing core determines color values of pixels forming the image 20 based on an analysis result. In this case, the ray tracing core determines the color values of the pixels by taking characteristics of the scene object 70 into account.

Figure 2:
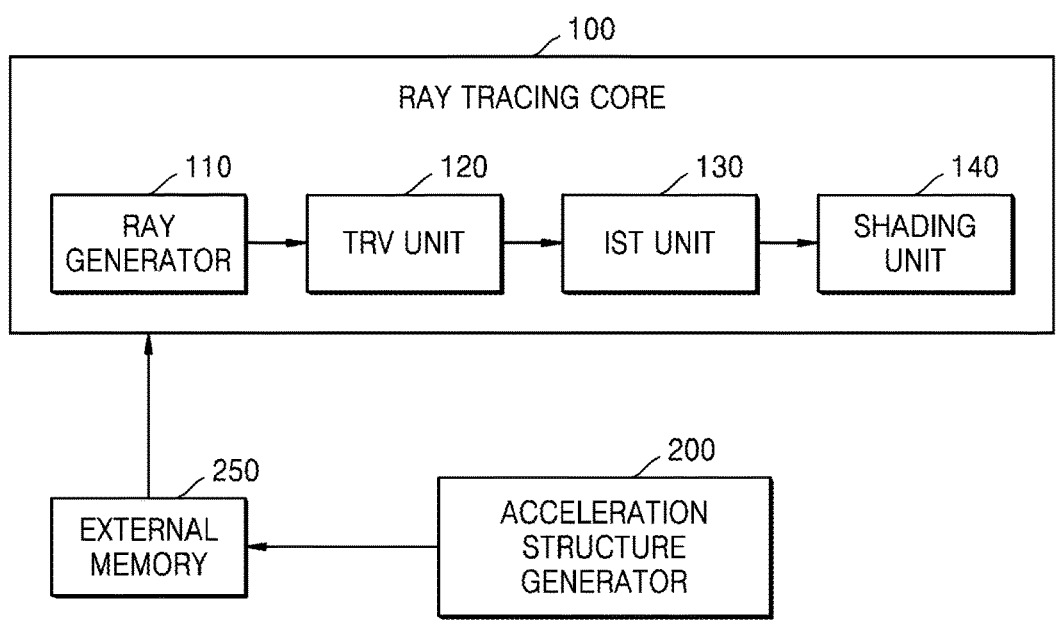
FIG. 2 is a diagram of a ray tracing core according to one or more embodiments.

FIG. 2 is a diagram of a ray tracing core 100 according to one or more embodiments. Referring to FIG. 2, the ray tracing core 100 includes a ray generator 110, a traverser (TRV) 120, an intersection (IST) tester 130, and a shader 140. In one example, the TRV 120 and the IST tester 130 are included in the ray tracing core 100 of FIG. 2, but may be embodied as separate hardware components. The ray tracing core 100 of FIG. 2 includes components with regard to the present embodiment but may further include other auxiliary components, in addition to the components of FIG. 2.

The ray tracing core 100 traces intersection points where the generated rays intersect objects placed in a 3D space and determines color values of pixels forming an image. In other words, the ray tracing core 100 finds the intersection points where the rays intersect the objects, generates secondary rays according to characteristics of the objects at the intersection points, and determines color values of the intersection points.

When traversing an acceleration structure and conducting an intersection test, the ray tracing core 100 may use a previous traversal result and a previous intersection test result. In other words, the ray tracing core 100 may apply a previous rendering result to a current rendering process, and thus, the current rendering process may be performed more quickly.

The ray generator 110 generates primary and secondary rays. The ray generator 110 generates the primary ray from a view point and generates the secondary ray such as a reflection ray, a refraction ray, or a shadow ray at an intersection point where the primary ray intersects an object. Also, the ray generator 110 may generate another secondary ray at an intersection point where the secondary ray intersects the object. The ray generator 110 may generate a reflection ray, a refraction ray, and a shadow ray within the certain number of times or may determine the number of times that the reflection ray, the refraction ray, and the shadow ray are generated according to the characteristics of the object.

The TRV 120 receives information about the generated rays from the ray generator 110. The generated rays include the primary ray, the secondary ray, and a ray derived from the secondary ray. For example, with regard to the primary ray, the TRV 120 may receive information about a view point and a direction of the generated rays. Also, with regard to the secondary ray, the TRV 120 may receive information about a start point and a direction of the secondary ray. The start point of the secondary ray indicates a point where the primary ray hits the object. The view point or the start point may be indicated as coordinates, and the direction may be indicated as vectors.

The TRV 120 reads information about an acceleration structure from an external memory 250. The acceleration structure is generated by an acceleration structure generator 200, and the generated acceleration structure is stored in the external memory 250. The acceleration structure is a structure including location information of objects in a 3D space. For example, the acceleration structure may include a K-dimensional (KD) tree, bounding volume hierarchy (BVH), etc., or any other traversal structure, as would be known to one of skill in the art after gaining a thorough understanding of the present disclosure.

The TRV 120 traverses the acceleration structure and outputs an object or a leaf node hit by the rays. For example, the TRV 120 traverses nodes included in the acceleration structure and outputs, to the IST tester 130, a leaf node, which is hit by the rays from among leaf nodes that are at the lowest level among the nodes. In other words, the TRV 120 determines which one of the bounding boxes forming the acceleration structure and which one of the objects included in the bounding boxes are hit by the rays. Information about the hit object is stored in TRV cache. The bounding box may be a unit including objects or primitives and may have different shapes depending on the acceleration structure. The TRV cache is a memory temporarily storing data used by the TRV 120 during traversal.

The TRV 120 may traverse the acceleration structure based on a previous rendering result. The TRV 120 may traverse the acceleration structure in the same path as a path in which previous rendering is performed, based on the previous rendering result stored in the TRV cache. For example, when traversing the acceleration structure for an input ray, the TRV 120 may traverse a bounding box hit by a previous ray, which has the same view point and direction as the input ray, first. Also, the TRV 120 may traverse the acceleration structure by referring to a traversal path of the previous ray.

The IST tester 130 receives the object or the leaf node hit by the ray from the TRV 120 and reads information about primitives included in the hit object from the external memory 250. The read information about the primitives may be stored in IST cache. The IST cache is a memory for temporarily storing data used by the IST tester 130 during intersection traversal.

The IST tester 130 conducts an intersection test between rays and primitives and outputs a primitive hit by a ray and an intersection point. The IST tester 130 which receives, from the TRV 120, which object is hit by the ray, examines which one of primitives included in the hit object is hit by the ray. After finding a primitive hit by the ray, the IST tester 130 outputs an intersection point indicating which point of the hit primitive intersects the ray. The intersection point may be output to the shader 140 in a coordinate form.

The IST tester 130 may conduct an intersection test based on the previous rendering result. The IST tester 130 may conduct an intersection test for a primitive, which is the same as a primitive for which previous rendering is performed, first based on the previous rendering result that is stored in the IST cache. For example, when an intersection test is conducted for the input ray and the primitive, the IST tester 130 may perform an intersection test first for a primitive hit by a previous ray having the same view point and direction as the input ray.

The shader 140 determines color values of pixels based on information about the intersection point received from the IST tester 130 and material characteristics of the intersection point. The shader 140 may determine color values of pixels by taking basic material colors of the intersection points, effects of a light source, etc. into account.

The ray tracing core 100 receives, from the external memory 250, data for ray tracing. Geometry data indicating information about an acceleration structure generated by the acceleration structure generator 200 or about primitives is stored in the external memory 250. The primitive may be a polygon such as a triangle or a square, and the geometry data may indicate information about peaks and locations of the primitives included in the object.

The acceleration structure generator 200 generates an acceleration structure including location information of the objects in the 3D space. The acceleration structure generator 200 may generate various shapes of acceleration structures. For example, the acceleration structure may have a shape in which the 3D space is divided into a hierarchical tree. The acceleration structure generator 200 may generate a structure indicating a relation between the objects in the 3D space by using a BVH or KD-tree. For example, the acceleration structure generator 200 may determine the maximum number of primitives of the leaf node and a tree depth and may generate the acceleration structure based on the determination.

Figure 3:
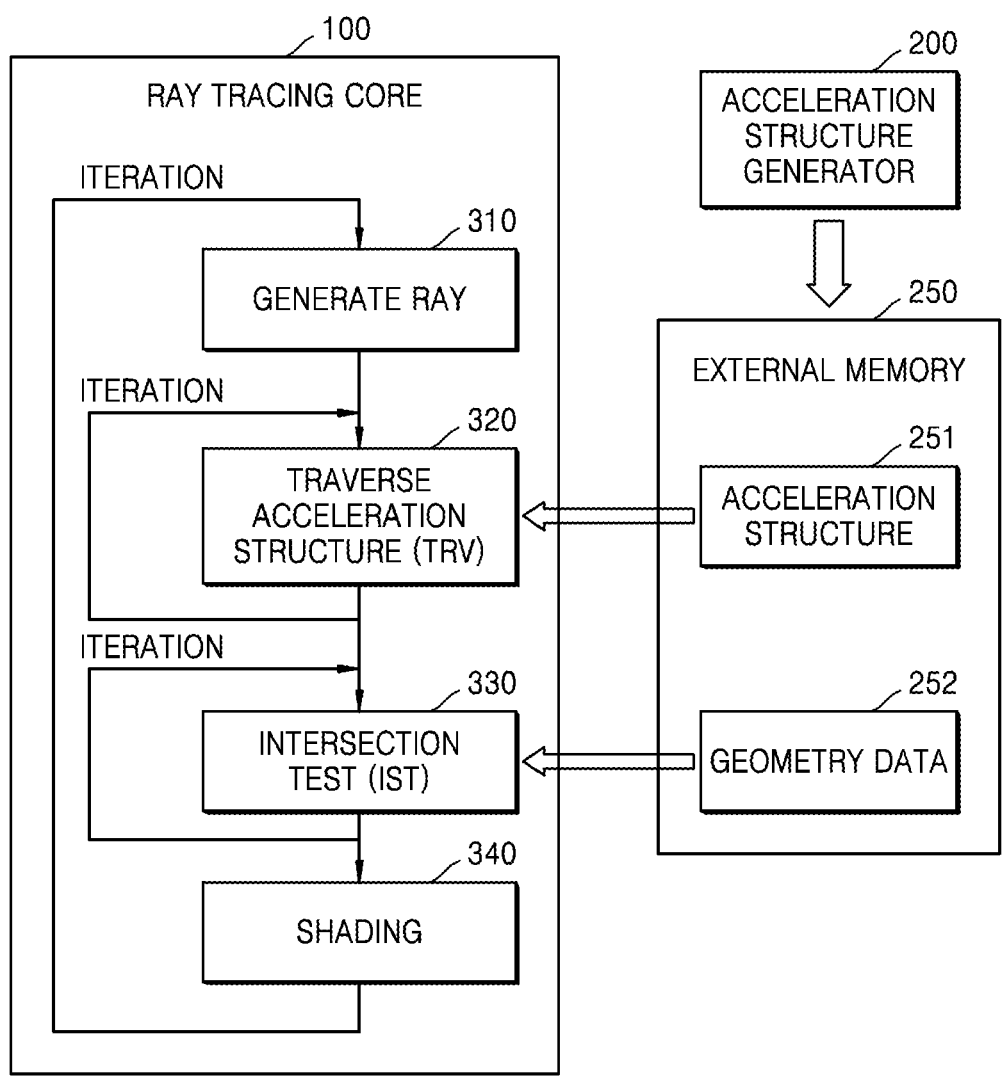
FIG. 3 is a diagram of an operation of performing ray tracing by a ray tracing core according to one or more embodiments.
Figure 4:
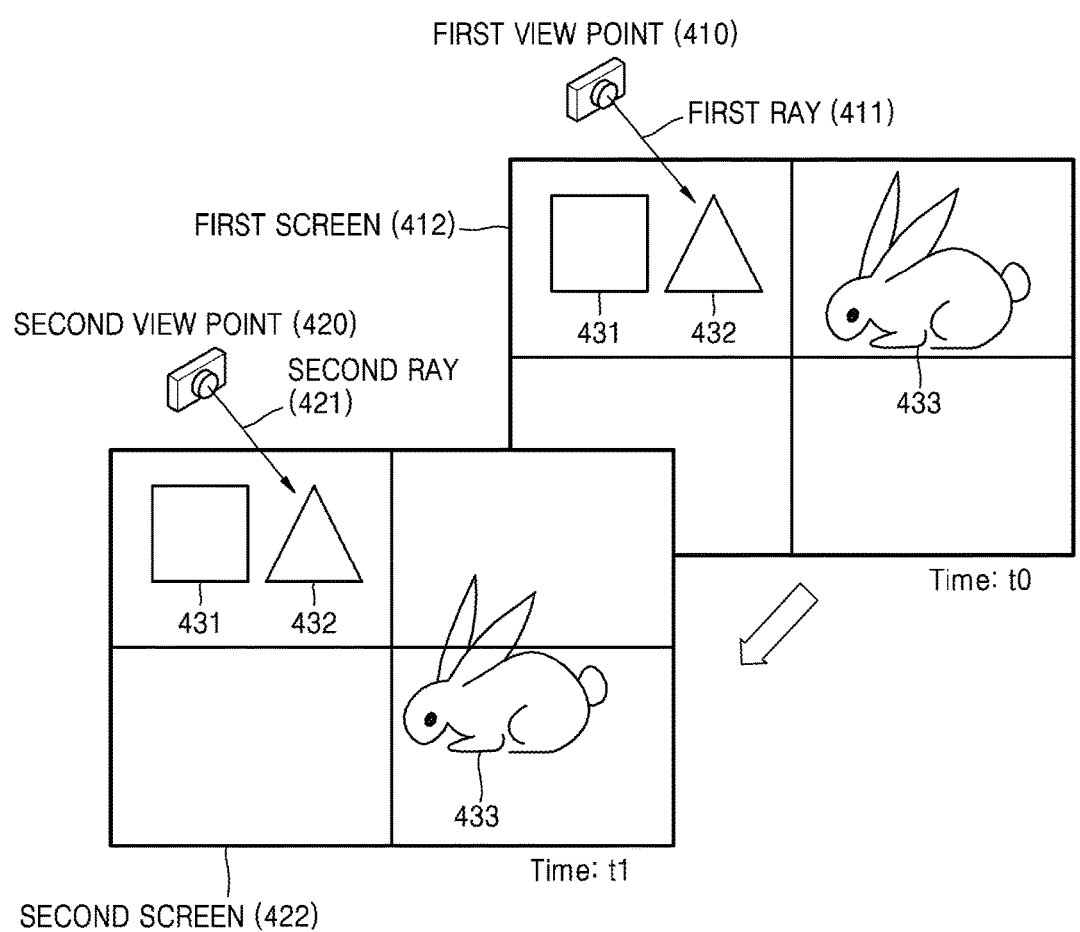
FIG. 4 is a diagram of a method of accelerating ray tracing according to one or more embodiments.
Figure 5:
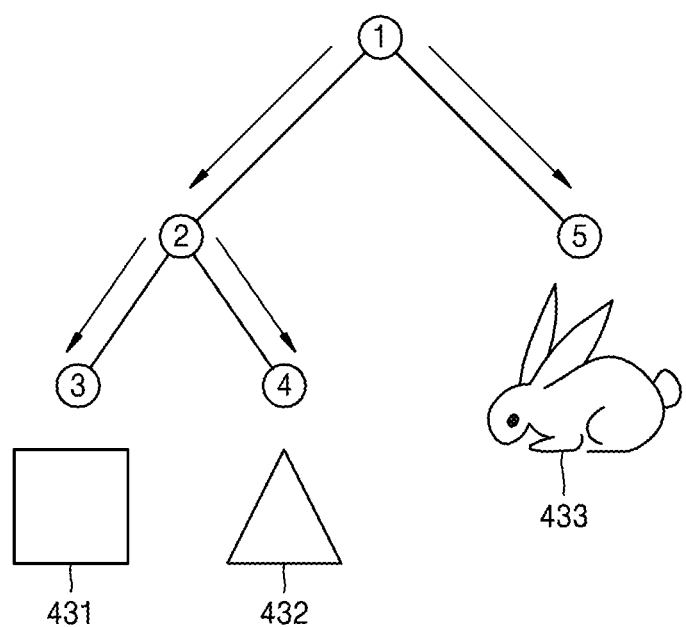
FIG. 5 is a diagram of a method of accelerating the ray tracing of FIG. 4 according to one or more embodiments.
Figure 6:
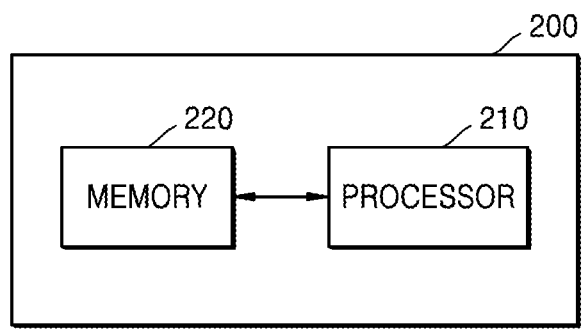
FIG. 6 is a block diagram of an apparatus for generating an acceleration structure according to one or more embodiments.

The apparatuses, units, modules, devices, and other components illustrated in any or all of FIGS. 2-3 and 6 that perform the operations described herein with respect to any of FIGS. 1, 3-5 and 7-12 are hardware components. Examples of the hardware components include controllers, sensors, generators, drivers, and any other electronic components known to one of ordinary skill in the art after gaining a full understanding of the present disclosure. In one example, the hardware components are or include one or more processing devices, such as processors, graphics processing units (GPU), processor cores, systems on chip (SOC), or computers, as only examples. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a specially defined manner to achieve a desired result. In one example, a processing device, such as the processor or computer may include, or be connected to, one or more memories storing instructions that are executed by the processor or computer. Hardware components implemented by a processor or computer execute instructions, such as an operating system (OS) and one or more applications that run on the OS, to perform the operations described herein with respect to any of FIGS. 1, 3-5, and 7-12. The hardware components also access, manipulate, process, create, and store data in response to execution of the instructions. For simplicity, the singular term "processing device", "processor", or "computer" may be used in the description of the examples described herein, but in other examples multiple processing devices, such as multiple processors, multiple cores, or computers, are used, or a processor or computer includes multiple processing elements, or multiple types of processing elements, or both. In one example, a hardware component includes multiple processing devices or processors, and in another example, a hardware component includes a processing device or processor and a controller. A hardware component has any one or more of different processing configurations, examples of which include a single processing device or processor, independent processing devices or processors, parallel processing devices or processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

FIG. 3 is a diagram of an operation of performing ray tracing by the ray tracing core 100 according to one or more embodiments. The ray tracing core 100 may have, for example, a structure of the ray tracing core 100 of FIG. 2 or other suitable structure as discussed above. Therefore, although not repeated here for clarity and conciseness, the descriptions of the ray tracing core 100 are applied to the ray tracing of FIG. 3.

In operation 310, the ray tracing core 100 generates rays. The ray tracing core 100 generates a primary ray, a secondary ray, and a ray derived from the secondary ray.

In operation 320, the ray tracing core 100 traverses an acceleration structure 251 read from the external memory 250. The ray tracing core 100 may detect a bounding box hit by a ray by traversing the acceleration structure 251 based on view points and directions of the generated rays to detect an object hit by a ray from among objects included in the hit bounding box. The ray tracing core 100 repeatedly traverses the acceleration structure 251 until an object hit by a ray is found. For example, the ray tracing core 100 traverses the acceleration structure 251 along a path and traverses the acceleration structure 251 along another path if a leaf node on the path used to traverse the acceleration structure 251 is hit by a ray.

The ray tracing core 100 may sequentially traverse all paths, but may traverse a certain path first based on traversal information of a previous ray. For example, when a view point and a direction of the previous ray are the same as or similar to a view point and a direction of a current ray, the ray tracing core 100 may traverse a path including a leaf node hit by the previous ray first.

In operation 330, the ray tracing core 100 conducts an intersection test. The ray tracing core 100 conducts the intersection test based on geometry data 252 of primitives read from the external memory 250. The ray tracing core 100 repeatedly conducts the intersection test until a primitive hit by a ray is detected. For example, the ray tracing core 100 conducts an intersection test regarding a first one of the primitives and conducts an intersection test regarding another primitive if the first primitive is not hit by the ray.

The ray tracing core 100 may sequentially conduct intersection tests for all of the primitives, but according to one or more embodiments, the ray tracing core 100 may initially conduct an intersection test for a certain primitive based on intersection test information regarding the previous ray. For example, when a view point and a direction of the previous ray are the same as or similar to a view point and a direction of a current ray, the ray tracing core 100 may conduct an intersection test for a primitive hit by the previous ray.

In operation 340, the ray tracing core 100 performs shading of a pixel based on the intersection test. The ray tracing core 100 iterates again to perform operation 310 when operation 340 is terminated. The ray tracing core 100 repeatedly performs operations 310 to 340 for all pixels forming an image.

FIG. 4 is a diagram of a method of accelerating ray tracing according to one or more embodiments. Referring to FIG. 4, a first image 412 screen is rendered when time t is 0, and a second image 422 screen is rendered when t is 1. Between the first image 412 and the second image 22, of the objects 431, 432, and 433, only a rabbit 433 moves, and a square 431 and a triangle 432 do not move, and thus, the first image 412 and the second image 422 are almost the same. Therefore, the ray tracing core 100 may perform rendering on the second image 422 based on a result of rendering the first image 412. For example, if locations of a first view point 410 and a second view point 420 are the same and directions of a first ray 411 and a second ray 421 are the same, the ray tracing core 100 may accelerate the ray tracing on the second ray 421 by applying a ray tracing result regarding the first ray 411 to a ray tracing result regarding the second ray 421. For example, the TRV 120 of the ray tracing core 100 may traverse a bounding box hit by the first ray 411 first during the traversal of the second ray 421. Also, the IST tester 130 of the ray tracing core 100 may conduct an intersection test first for the triangle 432 hit by the first ray 411 when an intersection test regarding the second ray 421 is conducted.

FIG. 5 is a diagram of a method of accelerating ray tracing according to one or more embodiments. Referring to FIG. 5, the acceleration structure includes five nodes, that is, nodes 1 to 5, and the nodes 3 to 5 are leaf nodes.

The TRV 120 may traverse the acceleration structure along three paths. First of all, the TRV 120 may traverse the acceleration structure along the node 1, the node 2, and the node 3, sequentially, that is, a first path. Then, the TRV 120 may traverse the acceleration structure along a second path defined by node 1, node 2, and node 4. Lastly, the TRV 120 may traverse the acceleration structure along a third path defined by node 1 and the node 5. In this case, when traversing the second ray 421, the TRV 120 traverses the second path in which the triangle 432 hit by the first ray 411 first. Therefore, the TRV 120 may beneficially skip a process of traversing the first or third path.

FIG. 6 is a simplified block diagram of an apparatus generating an acceleration structure according to one or more embodiments. Referring to FIG. 6, the acceleration structure generator 200 includes a processor 210, such as e.g. one or more GPU cores, CPU cores, SOCs, FPGAs, PLAs, or other suitable computational structure, and a memory 220, such as one or more levels of cache or random access memories. The acceleration structure generator 200 includes the memory 220 in which information about the acceleration structure is stored. The information about the acceleration structure may include information about a 3D space indicated by the acceleration structure.

The processor 210 may, for example, obtain Morton codes indicating respective locations of primitives included in the 3D space. The Morton codes linearly indicate the locations of the primitives included in the 3D space.

A Morton curve, or Z-order curve, may be used to obtain the Morton codes. The Morton curve denotes a line or lines that sequentially pass through grids that are produced by equally dividing the 3D space. Numbers may be assigned to the grids according to an order in which the Morton curve passes through the grids.

The Morton codes of the primitives may be numbers assigned to the grids including the primitives. Therefore, a distance between two primitives may be presented as a difference between Morton codes corresponding to the two primitives. For example, a Morton distance between a first primitive and a second primitive may be obtained by calculating a difference between a first Morton code corresponding to the first primitive and a second Morton code corresponding to the second primitive.

The processor 210 adjusts a reference level of the acceleration structure based on the Morton distance. The reference level of the acceleration structure may be a reference for determining a method used to divide the 3D space. For example, a level of a root node of the acceleration structure is 1, and the reference level of the acceleration structure may be 3.

For example, the processor 210 may divide the 3D space corresponding to each of nodes included in level 1 to level 3 by using a first division method. Also, the processor 210 may divide the 3D space corresponding to each of nodes included in a level exceeding the level 3 by using a second division method.

For example, the processor 210 may divide the 3D space corresponding to each of nodes included in a level 1 to level 3 by using a surface area heuristic (SAH) method.

Also, the processor 210 may divide the 3D space corresponding to each of nodes included in a level exceeding the level 3 by using the Morton codes. For example, the processor 210 may divide the 3D space corresponding to each of nodes included in a level exceeding the level 3 by using an LBVH method or an AAC method.

In one or more embodiments, the processor 210 may adjust the reference level of the acceleration structure. The processor 210 may adjust the reference level of the acceleration structure based on a Morton distance of the 3D space. In an embodiment, the Morton distance may indicate a difference between a primitive having the greatest Morton code among primitives included in the 3D space and a primitive having the smallest Morton code.

In one or more embodiments, the processor 210 may divide the 3D space into sub-spaces including a first sub-space and a second sub-space. In this case, the processor 210 may divide the 3D space in order to reduce a Morton distance between the first sub-space and the second sub-space as much as possible.

In one or more embodiments, the processor 210 may divide the 3D space into the sub-spaces including the first sub-space and the second sub-space by using the SAH method. In this case, the processor 210 may calculate a Morton distance of the first sub-space. When the Morton distance of the first sub-space is less than a certain threshold value, the processor 210 may determine that the first sub-space has an SAH affinity.

The SAH affinity may be a parameter indicating whether a result of dividing the 3D space by using the Morton codes is similar to a result of dividing the 3D space by using the SAH method. In an embodiment, when the Morton distance of the 3D space is less than a certain threshold value, the processor 210 may determine that the 3D space has the SAH affinity.

In one or more embodiments, a Morton distance of the first sub-space is less than a certain threshold value, and a Morton distance of the second sub-space may be less than or equal to the certain threshold value. In this case, the processor 210 may determine that the first sub-space has the SAH affinity and the second sub-space does not have the SAH affinity.

In one or more embodiments, when the first sub-space has the SAH affinity, the processor 210 may decrease the reference level of the acceleration structure. Also, when the first sub-space does not have the SAH affinity, the processor 210 may increase the reference level of the acceleration structure.

For example, when a level of a first node is less than the reference level, the processor 210 may divide the first sub-space by the first division method. Also, when the level of the first node exceeds the reference level, the processor 210 may divide the first sub-space by the second division method.

For example, when the level of the first node is less than the reference level, the processor 210 may divide the first sub-space by the SAH method. Also, when the level of the first node exceeds the reference level, the processor 210 may divide the first sub-space by using the Morton codes. For example, the processor 210 may divide the first sub-space by the LBVH method or the AAC method.

In an embodiment, when the first sub-space is divided by using the Morton codes, the processor 210 may divide each sub-space included in the acceleration structure having the first node as the root by using the Morton codes.

In another embodiment, when the Morton distance of the 3D space is less than a certain threshold value, the processor 210 divides the 3D space by using the first division method. Also, when the Morton distance of the 3D space exceeds the certain threshold value, the processor 210 divides the 3D space by using the second division method.

For example, when the Morton distance of the 3D space is less than the certain threshold value, the processor 210 may divide the 3D space by using the SAH method. Also, when the Morton distance of the 3D space exceeds, meets, or approaches the certain threshold value, the processor 210 may divide the 3D space by using the Morton codes.

Figure 7:
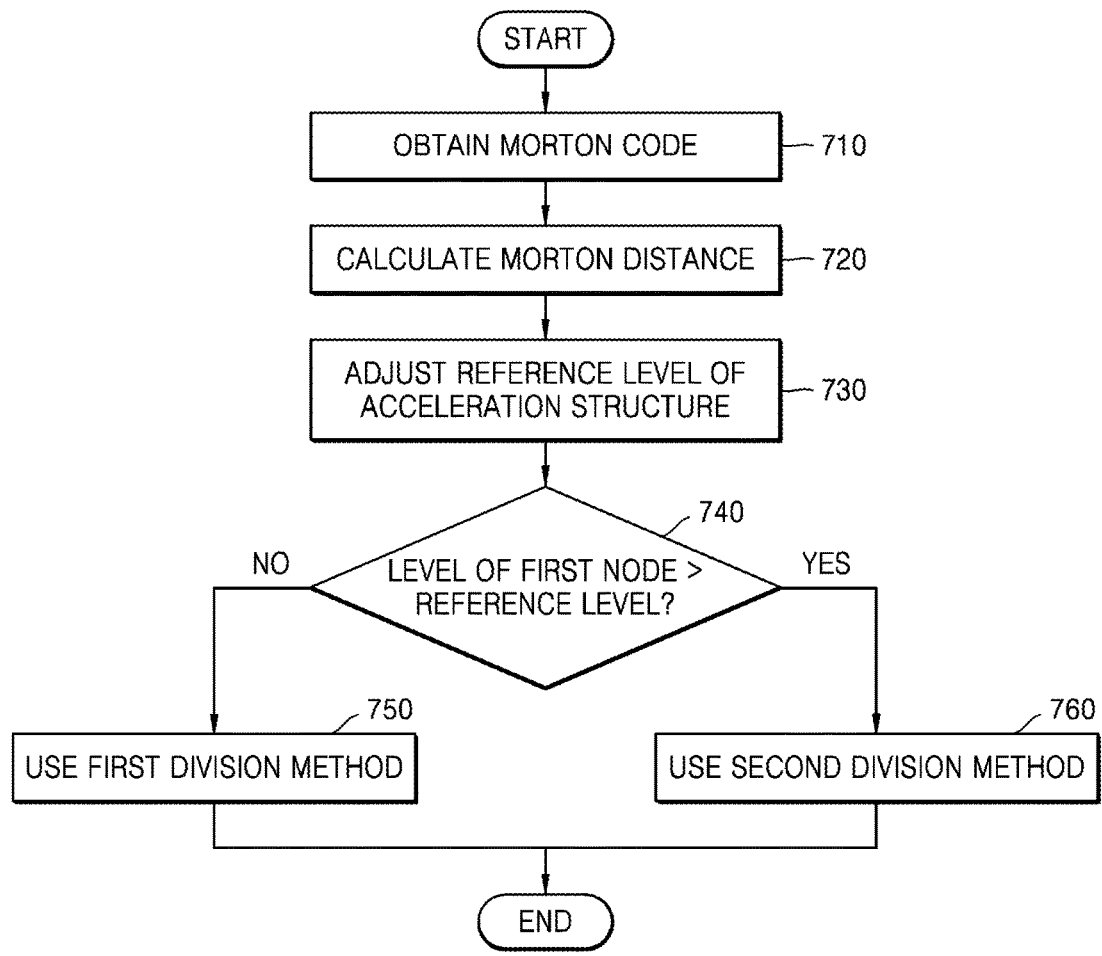
FIG. 7 is a flowchart of a method of generating an acceleration structure according to one or more embodiments.

FIG. 7 is a flowchart of a method of generating an acceleration structure according to one or more embodiments. Referring to FIG. 7, the acceleration structure generator 200 may generate an acceleration structure used for ray tracing.

In operation 710, the acceleration structure generator 200 obtains Morton codes indicating locations of primitives included in the 3D space. The Morton codes linearly indicate the locations of the primitives included in the 3D space.

In operation 720, the acceleration structure generator 200 calculates a Morton distance of the 3D space by using the Morton codes obtained in operation 710. The Morton distance of the 3D space indicates a difference between a first Morton code corresponding to a first primitive included in the 3D space and a second Morton code corresponding to a second primitive.

In one or more embodiments, the Morton distance may indicate a difference between a primitive having the greatest Morton code among the primitives included in the 3D space and a primitive having the smallest Morton code.

In operation 730, the acceleration structure generator 200 adjusts a reference level of the acceleration structure based on the Morton distance calculated in operation 720. When the Morton distance of the 3D space is less than the certain threshold value, the acceleration structure generator 200 may decrease the reference level of the acceleration structure.

Also, when the Morton distance of the 3D space exceeds the certain threshold value, the acceleration structure generator 200 may increase the reference level of the acceleration structure.

In operation 740, the acceleration structure generator 200 compares the reference level adjusted in operation 730 with a level of a first node. When the level of the first node is less than the reference level, the acceleration structure generator 200 divides the 3D space by using the first division method. When the level of the first node exceeds the reference level, the acceleration structure generator 200 divides the 3D space by using the second division method.

In operation 750, the acceleration structure generator 200 divides the 3D space by using the first division method. In one or more embodiments, the first division method may be the SAH method.

In operation 760, the acceleration structure generator 200 divides the 3D space by using the second division method. In an embodiment, the second division method may use the Morton codes. For example, the second division method may be an LBVH method or an AAC method, but is not limited thereto.

Figure 8:
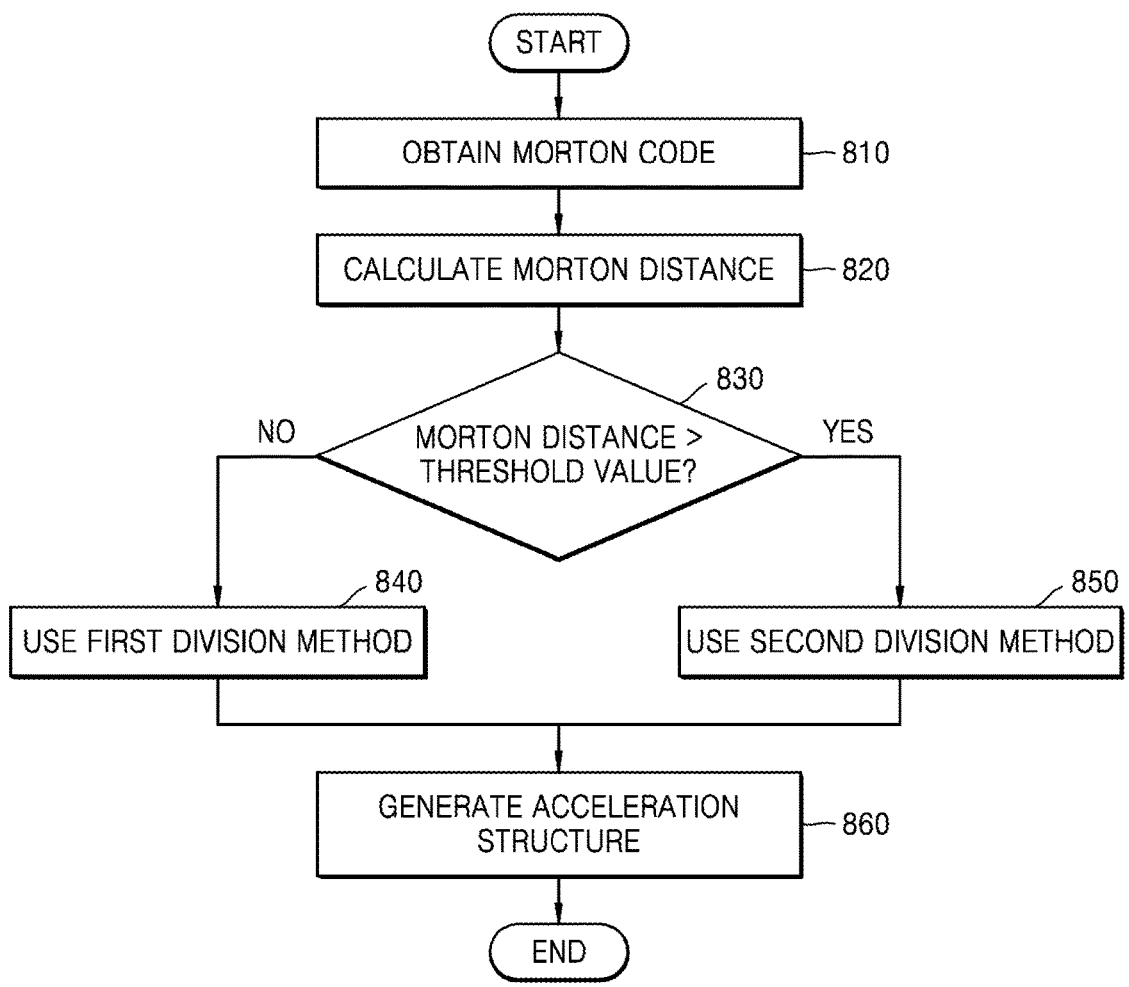
FIG. 8 is a flowchart of a method of generating an acceleration structure according to one or more embodiments.

FIG. 8 is a flowchart of a method of generating an acceleration structure according to one or more embodiments. Referring to FIG. 8, the acceleration structure generator 200 may generate an acceleration structure used for ray tracing.

In operation 810, the acceleration structure generator 200 obtains Morton codes indicating respective locations of primitives included in a 3D space. The Morton codes linearly indicate the locations of the primitives included in the 3D space.

In operation 820, the acceleration structure generator 200 calculates a Morton distance of the 3D space by using the Morton codes obtained in operation 810. The Morton distance of the 3D space shows a difference between a first Morton code corresponding to a first primitive and a second Morton code corresponding to a second primitive.

In operation 830, the acceleration structure generator 200 compares the Morton distance calculated in operation 820 with a certain threshold value. When the Morton distance of the 3D space is less than the certain threshold value, the acceleration structure generator 200 divides the 3D space into multiple sub-spaces by using the first division method.

When the Morton distance of the 3D space exceeds the certain threshold value, the acceleration structure generator 200 divides the 3D space into multiple sub-spaces by using the second division method.

In operation 840, the acceleration structure generator 200 divides the 3D space into the sub-spaces by using the first division method. In an embodiment, the first division method may be the SAH method.

In operation 850, the acceleration structure generator 200 divides the 3D space into the sub-spaces by using the second division method. In one or more embodiments, the second division method may be a method using the Morton codes. For example, the second division method may be the LBVH method or the AAC method, but is not limited thereto.

In operation 860, the acceleration structure generator 200 sets each sub-space divided in operation 840 or operation 850 as a node included in the acceleration structure to thus generate the acceleration structure. In one or more embodiments, each node may include a data structure such as a structure, struct, a union, or a class, or other suitable data structure, but is not limited thereto.

Figure 9:
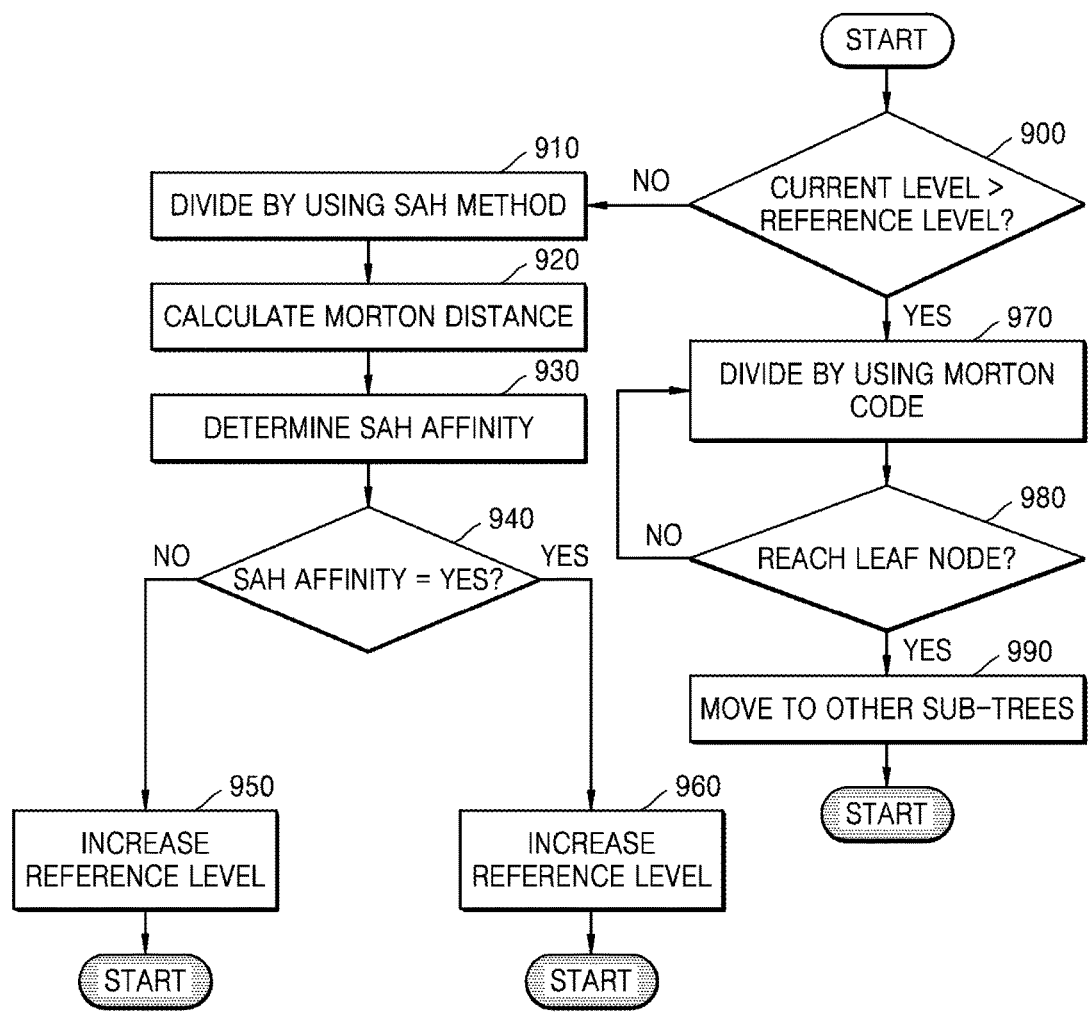
FIG. 9 is a flowchart of a method of generating an acceleration structure according to one or more embodiments.

FIG. 9 is a flowchart of a method of generating an acceleration structure according to one or more embodiments. Referring to FIG. 9, the acceleration structure generator 200 may generate an acceleration structure used for ray tracing.

The acceleration structure generator 200 (as seen, for example, in FIGS. 2-3 and 6) may set initial conditions before generating the acceleration structure. In an embodiment, the initial conditions may include a reference level of the acceleration structure and SAH affinity. For example, under the initial conditions, the reference level may be 3, and the SAH affinity may be "No".

An initial condition of the reference level may differ according to frames. For example, the acceleration structure generator 200 may refer to a result of generating an acceleration structure for one or more proximate frames so as to generate an acceleration structure for a current frame.

Since the frames in close proximity are highly likely to be similar to the current frame, the acceleration structure generator 200 may refer to SAH affinity of the proximity frames. If the proximate frames mostly have the SAH affinity, the acceleration structure generator 200 may predict that the current frame mostly has the SAH affinity.

In this case, the acceleration structure generator 200 may decrease the number of times that the SAH affinity regarding the current frame is checked. For example, the acceleration structure generator 200 may reduce initial conditions of a reference level of the current frame.

In operation 900, the acceleration structure generator 200 may compare a current level with a reference level. If, for example, the current level does not exceed the reference level, the acceleration structure generator 200 performs operation 910.

In one or more embodiments, the initial condition of the reference level may be set to be 0. For example, if a 3D space of a previous frame mostly has the SAH affinity, the acceleration structure generator 200 may predict that the current frame also has the SAH affinity. In this case, the acceleration structure generator 200 may skip a process of checking the SAH affinity by setting the initial condition of the reference level to be 0.

In operation 910, the acceleration structure generator 200 may divide the 3D space by using the SAH method. In one or more embodiments, the acceleration structure generator 200 may divide the 3D space into a first sub-space and a second sub-space.

In operation 920, the acceleration structure generator 200 may calculate a Morton distance regarding the 3D space divided in operation 910. In one or more embodiments, the acceleration structure generator 200 may calculate a Morton distance regarding the first sub-space.

Figure 10:
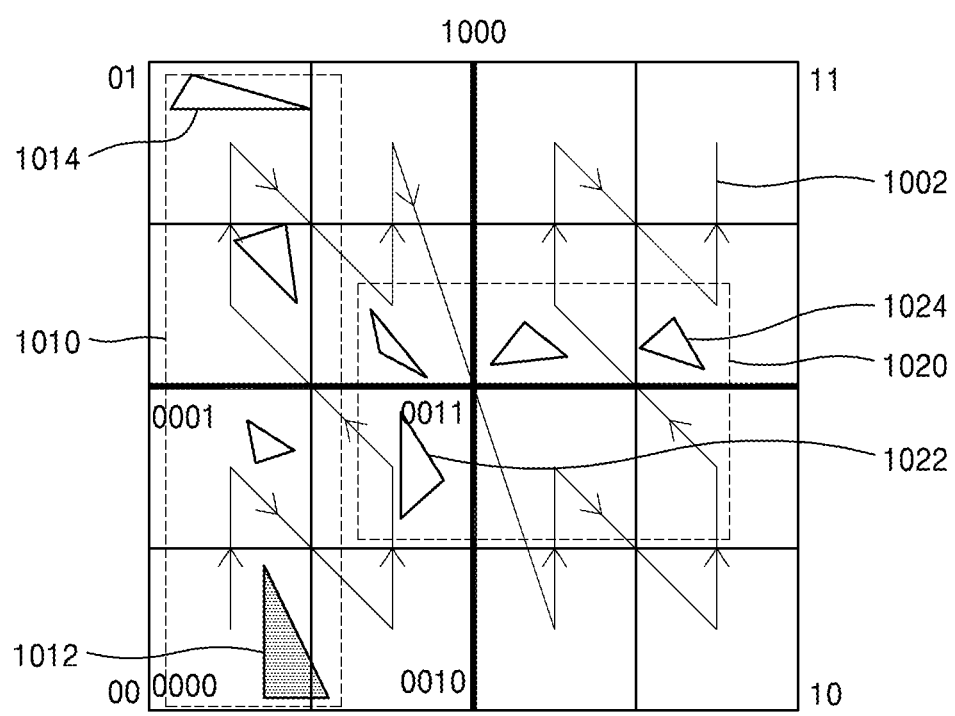
FIG. 10 is a diagram of an example of a method of generating an acceleration structure.

FIG. 10 is a diagram of an example of a method of generating an acceleration structure in accordance with one or more embodiments. FIG. 10 shows a result of dividing a 3D space 1000 into a first sub-space 1010 and a second sub-space 1020 by using the SAH method.

The first sub-space 1010 includes primitives including a first primitive 1012 and a second primitive 1014. The second sub-space 1020 includes primitives such as a third primitive 1022 and a fourth primitive 1024.

The acceleration structure generator 200 may obtain Morton codes indicating locations of the primitives included in the 3D space. In FIG. 10, the fourth primitive 1024 may obtain the Morton codes by using a Morton curve 1002.

The Morton curve 1002 is a line (or path including a series of line segments) that sequentially passes through all grids produced by equally dividing the 3D space. Numbers may be assigned to the grids according to an order in which the Morton curve 1002 passes through the grids. The Morton code of each primitive may, for example, be a number assigned to the grid including the primitive.

For example, a Morton code of the first primitive 1012 may be a binary number 0000, and a Morton code of the second primitive 1014 may be a binary number 0101. Also, a Morton code of the third primitive 1022 may be a binary number 0011, and a Morton code of the fourth primitive 1024 may be a binary number 1110.

In one or more embodiments, a Morton distance of the first sub-space 1010 may be obtained, for example, by calculating a difference between a Morton code of the first primitive 1012 having the smallest Morton code and a Morton code of the second primitive 1014 having the greatest Morton code, the inverse, by absolute difference, or other suitable measures.

For example, the Morton distance of the first sub-space 1010 may be 5. Such Morton distance may be calculated by subtracting the Morton distance of the first primitive 1012 from the Morton distance of the second primitive 1014. Also, the Morton distance of the second sub-space 1020 may be 11 which is calculated by subtracting the Morton distance of the third primitive 1022 from the Morton distance of the fourth primitive 1024.

In operation 930 (of FIG. 9), the acceleration structure generator 200 may determine SAH affinity of the space divided in operation 910 based on the Morton distance calculated in operation 920. For example, the acceleration structure generator 200 may determine the SAH affinity of the first sub-space 1010.

The SAH affinity may be a parameter indicating whether a result of dividing the 3D space by using the Morton codes is similar to a result of dividing the 3D space by using the SAH method.

Figure 11:
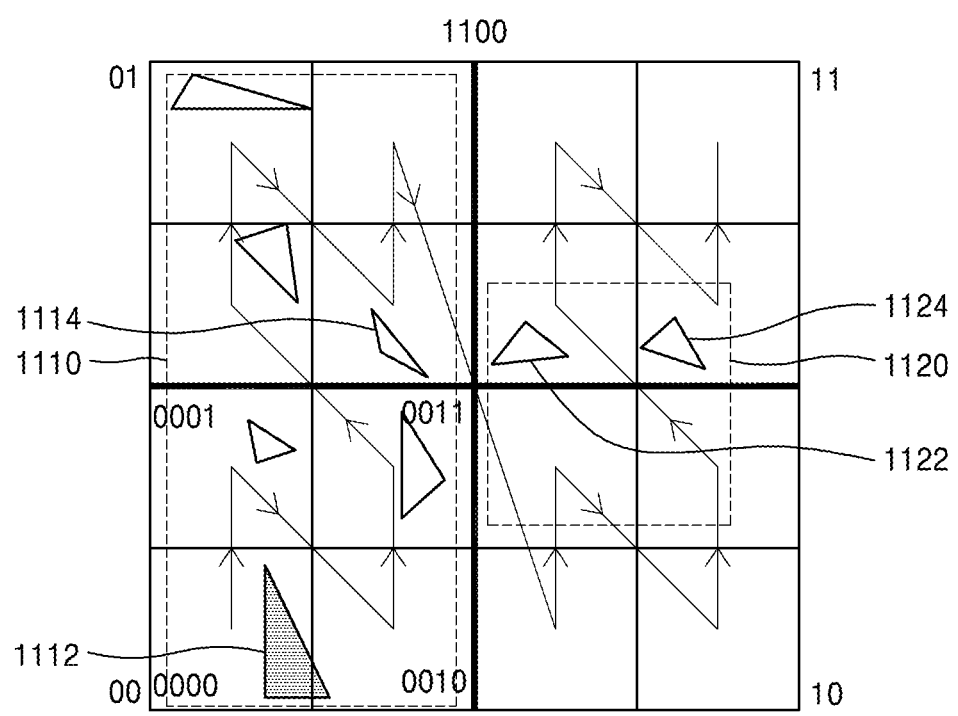
FIG. 11 is a diagram of an example of dividing a 3-dimensional (3D) space though a surface area heuristic (SAH) method.

FIG. 11 is a diagram of an example of dividing a 3D space 1100 though an SAH method. Referring to FIG. 11, the 3D space 1100 is divided into a first sub-space 1110 and a second sub-space 1120 by using Morton codes. The first sub-space 1110 includes a first primitive 1112 and a second primitive 1114. Also, the second sub-space 1120 may include a third primitive 1122 and a fourth primitive 1124.

Referring, for example, to FIG. 11, a Morton distance of the first sub-space 1110 is equal to 6 which is produced by subtracting a Morton code of the first primitive 1112 from a Morton code of the second primitive 1114. Also, a Morton distance of the second sub-space 1120 is equal to 2 which is calculated by subtracting a Morton code of the third primitive 1122 from a Morton code of the fourth primitive 1124.

Referring to FIGS. 10 and 11, since the number of primitives included in the first sub-space 1010 of FIG. 10 is different from the number of primitives included in the first sub-space 1110 of FIG. 11, it is difficult to directly determine similarity between their division results. However, it may be predicted, with reasonable accuracy, that the smaller the Morton distance of the space divided by using the SAH method is, the more similar the division results are.

In one or more embodiments, the processor 210 may determine that the 3D space 1100 has SAH affinity when the Morton distance of the 3D space is smaller than a certain threshold value.

Referring to FIG. 10, the Morton distance of the first sub-space 1010 is 5, and the Morton distance of the second sub-space 1020 is 11. For example, when the certain threshold value is 10, the acceleration structure generator 200 may determine that the first sub-space 1110 has the SAH affinity, and the second sub-space 1120 does not have the SAH affinity.

In operation 940 (of FIG. 9), the acceleration structure generator 200 may adjust a reference level of the acceleration structure based on the SAH affinity determined in operation 930. In one or more embodiments, when the first sub-space 1110 does not have the SAH affinity, the acceleration structure may be adjusted in operation 950 by increasing the reference level.

In operation 950, the acceleration structure generator 200 may increase the reference level of the acceleration structure. For example, the reference level of the acceleration structure that has a first node as a root may increase to 4 from 3. When the adjustment of the reference level is completed, the acceleration structure generator 200 may perform operation 900.

In one or more embodiments, when the first sub-space 1110 has the SAH affinity, the acceleration structure generator 200 may perform operation 960. In operation 960, the acceleration structure generator 200 may decrease the reference level of the acceleration structure.

For example, the reference level of the acceleration structure that has the first node as the root may decrease to 2 from 3. When the adjustment of the reference level is completed, the acceleration structure generator 200 may perform operation 900 again.

In operation 900, the acceleration structure generator 200 may compare a current level with the reference level. If the current level exceeds the reference level, the acceleration structure generator 200 may perform operation 970.

In operation 970, the acceleration structure generator 200 may divide a space by using the Morton codes. For example, the acceleration structure generator 200 may divide the space by using the LBVH method or the AAC method, but a division method is not limited thereto.

The acceleration structure generator 200 may divide spaces that respectively correspond to sub-nodes included in the first node by using the Morton codes by repeatedly performing operations 970 and 980 until the spaces reach leaf nodes. If the spaces correspond to the leaf nodes in operation 980, the acceleration structure generator 200 may generate an acceleration structure for another sub-tree in operation 990. For example, a process of generating the acceleration structure having the first node corresponding to the first sub-space 1110 as the root is terminated, the acceleration structure generator 200 may generate an acceleration structure having a second node corresponding to the second sub-space 1120 as a root.

Figure 12:
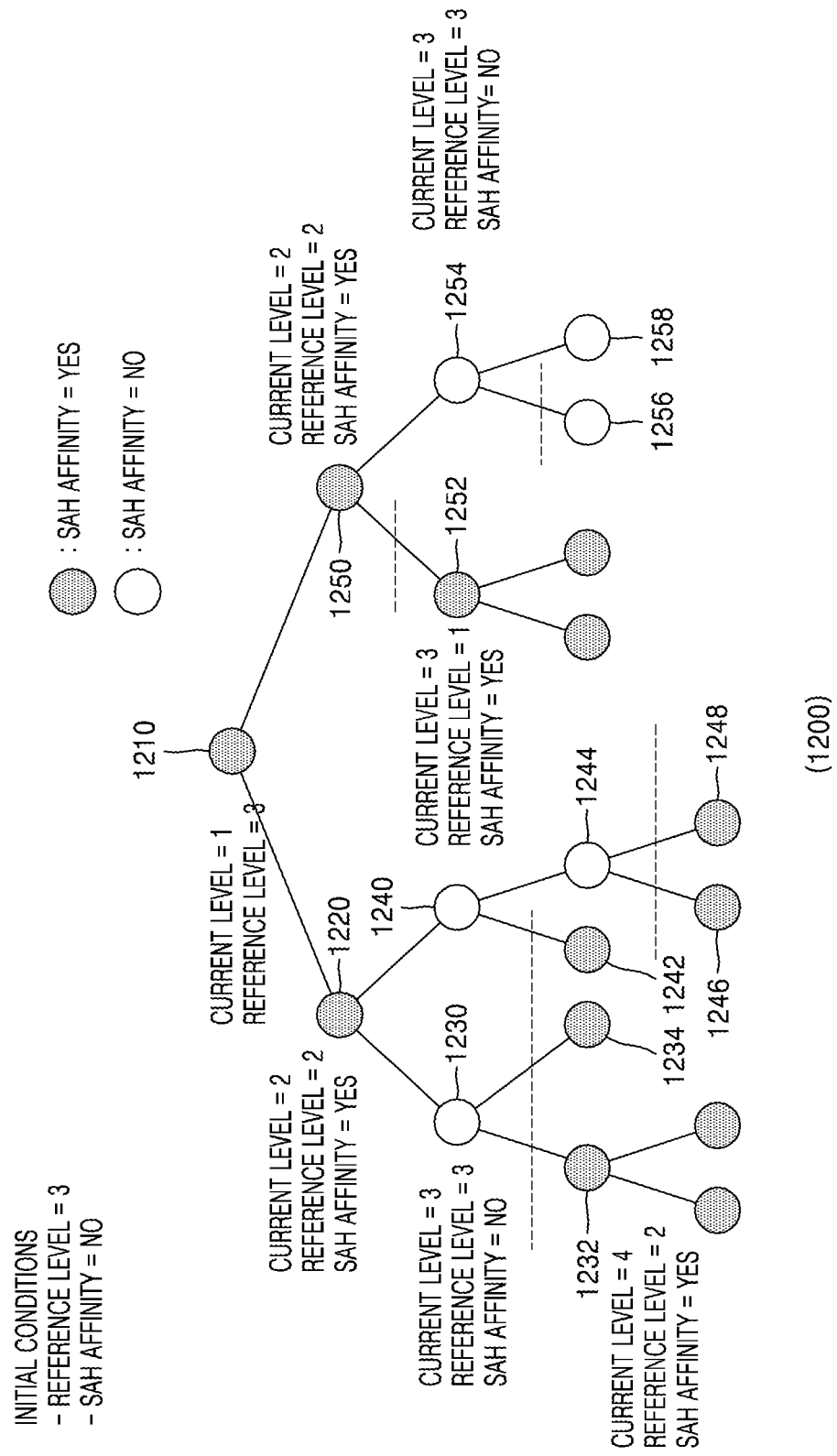
FIG. 12 is a diagram of an example of dividing a 3D space by using Morton codes.

FIG. 12 is a diagram of an example of dividing a 3D space using Morton codes according to one or more embodiments. In an example, an initial condition of a reference level may be 3, and an initial condition of SAH affinity may be "NO".

Referring to FIG. 12, a level of a root node 1210 is 1, and the reference level is 3. In an embodiment, the acceleration structure generator 200 may divide a 3D space corresponding to the root node 1210 into a first sub-space and a second sub-space by using the SAH method. A node 1220 corresponding to the first sub-space and a node 1250 of the second sub-space may be child nodes of the root node 1210.

The acceleration structure generator 200 may determine that the first sub-space has the SAH affinity. Therefore, a level of the node 1220 is 2, and a reference level of a sub-tree having the node 1220 as a root node may decrease to 2.

The acceleration structure generator 200 may divide the first sub-space into two spaces by using the SAH method and may match the two spaces with nodes 1230 and 1240. The acceleration structure generator 200 may determine that the space corresponding to the node 1230 does not have the SAH affinity.

Therefore, a level of the node 1230 may be 3, and a reference level of a sub-tree having the node 1230 as a root node may increase to 3. The acceleration structure generator 200 may divide a space corresponding to the node 1230 into two spaces by using the SAH method and may match the two spaces with nodes 1232 and 1234. The acceleration structure generator 200 may determine that the space corresponding to the node 1232 has the SAH affinity.

Therefore, a level of the node 1232 may be 4, and a reference level of a sub-tree having the node 1232 as a root may decrease to 2. Since a current level exceeds the reference level, the acceleration structure generator 200 may divide spaces corresponding to the nodes included in the sub-tree having the node 1232 as the root by using the Morton codes.

When an acceleration structure for the sub-tree having the node 1232 as the root has been completely generated, the acceleration structure generator 200 may move to another sub-tree. Referring to FIG. 12, the acceleration structure generator 200 may generate an acceleration structure for a sub-tree having the node 1234 as a root.

The acceleration structure generator 200 may determine that the space corresponding to the node 1234 does not have the SAH affinity. Therefore, a level of the node 1234 may be 4, and a reference level of the sub-tree having the node 1234 as the root may decrease to 2.

Since the node 1234 is a leaf node, the acceleration structure generator 200 may move to the sub-tree having the node 1234 as the root. The acceleration structure generator 200 may determine that the space corresponding to the node 1240 does not have the SAH affinity. Therefore, a level of the node 1240 may be 3, and a reference level of a sub-tree having the node 1240 as the root may increase to 3.

The acceleration structure generator 200 may divide the space corresponding to the node 1240 into two spaces by using the SAH method and may match the spaces with nodes 1242 and 1244. Since the node 1242 is a leaf node, the acceleration structure generator 200 may generate an acceleration structure for a sub-tree having the node 1244 as a root.

The acceleration structure generator 200 may determine that the space corresponding to the node 1244 does not have the SAH affinity. Therefore, a level of the node 1244 may be 4, and a reference level of a sub-tree having the node 1244 as the root may increase to 4.

The acceleration structure generator 200 may divide the space corresponding to the node 1244 into two spaces by using the SAH method and may match the spaces with nodes 1246 and 1248. Since the nodes 1246 and 1248 are leaf nodes, the acceleration structure generator 200 may generate an acceleration structure for a sub-tree having the node 1250 as a root.

The acceleration structure generator 200 may determine that the space corresponding to the node 1250 has the SAH affinity. Therefore, a level of the node 1250 may be 2, and a reference level of a sub-tree having the node 1250 as the root may decrease to 2.

The acceleration structure generator 200 may divide the second sub-space into two spaces by using the SAH method and may match the spaces with nodes 1252 and 1254. In an embodiment, the acceleration structure generator 200 may determine that the space corresponding to the node 1252 has the SAH affinity.

Therefore, a level of the node 1252 may be 3, and a reference level of a sub-tree having the node 1252 as the root may decrease to 1. Since a current level exceeds the reference level, the acceleration structure generator 200 may divide spaces corresponding to nodes included in the sub-tree having the node 1252 as the root by using the Morton codes.

The acceleration structure generator 200 may generate an acceleration structure for a sub-tree having the node 1254 as a root. The acceleration structure generator 200 may determine that the space corresponding to the node 1254 does not have the SAH affinity.

Therefore, a level of the node 1254 may be 3, and a reference level of a sub-tree having the node 1254 as the root may increase to 3. The acceleration structure generator 200 may divide the space corresponding to the node 1254 into two spaces by using the SAH method and may match the spaces with nodes 1256 and 1258. Since the nodes 1256 and 1258 are leaf nodes, the acceleration structure generator 200 may terminate the generation of the acceleration structure.

A computing system or a computer may include a microprocessor that is electrically connected to a bus, a user interface, and a memory controller, and may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent to one of ordinary skill in the art that the computing system or computer may further include an application chipset, a camera image processor, a mobile Dynamic Random Access Memory (DRAM), or any other device known to one of ordinary skill in the art as being suitable for inclusion in a computing system or computer. The memory controller and the flash memory device may constitute a solid-state drive or disk (SSD) that uses non-volatile memory to store data.

The methods illustrated in FIGS. 1, 3-5, and 7-12 that perform the operations described herein according to one or more embodiments may be performed by one or more processing devices, such as a processor or a computer, as only examples, and as described above executing instructions to perform the operations described herein.

Instructions to control such a processor or computer, for example, to implement the hardware components and perform the methods as described above are written as processor or computer readable programs, code segments, instructions or any combination thereof, for individually or collectively instructing or configuring the processor or computer to operate as a machine or special-purpose computer to perform the operations performed by the hardware components and the methods as described above. In one example, the instructions include machine code that is directly executed by the processor or computer, such as machine code produced by a compiler. In another example, the instructions include higher-level code that is executed by the processor or computer using an interpreter. Programmers of ordinary skill in the art, after gaining a full understanding of the following description, can readily write the instructions based on the block diagrams and the flow charts illustrated in the drawings and the corresponding descriptions in the specification, which disclose algorithms for performing the operations performed by the hardware components and the methods as described above.

The instructions to control a processing device, processor, or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions and any associated data, data files, and data structures in a non-transitory manner and providing the instructions and any associated data, data files, and data structures to a processor or computer so that the processor or computer can execute the instructions. In one example, the instructions and any associated data, data files, and data structures are distributed over network-coupled computer systems so that the instructions and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of generating and using an acceleration structure for ray tracing a three-dimensional scene including primitives, the method comprising:
    obtaining Morton codes indicating respective locations of the primitives comprised in a first space;
    calculating a Morton distance indicating a difference between a first Morton code corresponding with a first primitive and a second Morton code corresponding with a second primitive;
    adjusting a reference level of the acceleration structure, based on the Morton distance; and
    dividing the first space using a first division method in response to a level of a first node of the acceleration structure which corresponds to the first space being lower than the reference level, and dividing the first space using a second division method in response to the level of the first node exceeding the reference level;
    ray tracing from a viewpoint by casting rays into three-dimensional scene by using the acceleration structure; and
    generating respective pixel values on an image plane by using results of the ray tracing.

2. The method of claim 1, wherein the first division method comprises a surface area heuristic (SAH) method, and
    the second division method comprises a division method using the Morton codes.

3. The method of claim 2, wherein the dividing of the first space comprises dividing spaces respectively corresponding to sub-nodes included in the first node by using the Morton codes in response to the level of the first node exceeding the reference level.

4. The method of claim 2, further comprising obtaining sub-spaces comprising the first space by dividing a second space by using the SAH method.

5. The method of claim 1, wherein the first primitive comprises a primitive having a smallest Morton code, and
    the second primitive comprises a primitive having a greatest Morton code.

6. The method of claim 1, wherein the adjusting of the reference level comprises decreasing the reference level when the Morton distance is less than a certain threshold value and increasing the reference level when the Morton distance is equal to or greater than the certain threshold value.

7. The method of claim 1, wherein the obtaining Morton codes comprises transformatively mapping locations of object primitives in the first space into Morton codes indicating respective locations of the primitives along a meandering linear path through the first space.

8. A non-transitory computer-readable recording medium having embodied thereon a computer program which, when executed by a computer, performs the method of claim 1.

9. A method of generating an acceleration structure for ray tracing, the method comprising:
    obtaining Morton codes indicating locations of primitives comprised in a first space;
    calculating a Morton distance indicating a difference between a first Morton code corresponding with a first primitive and a second Morton code corresponding with a second primitive;
    dividing the first space into sub-spaces by using a first division method in response to the Morton distance being less than a certain threshold value and dividing the first space into the sub-spaces by using a second division method in response to the Morton distance exceeding the certain threshold value;

generating the acceleration structure by setting each of the sub-spaces as a node comprised in the acceleration structure;

ray tracing rays generated from a viewpoint to intersect a scene object by using the generated acceleration structure; and using the results from the ray tracing to determine color values of pixels for forming an image.

10. The method of claim 9, wherein the first primitive comprises a primitive having a smallest Morton code, and the second primitive comprises a primitive having a greatest Morton code.

11. The method of claim 9, wherein the first division method comprises a surface area heuristic (SAH) method, and the second division method comprises a division method using the Morton codes.

12. An apparatus for generating and using an acceleration structure for ray tracing a three-dimensional scene including primitives, the apparatus comprising:

a memory configured to store information about the acceleration structure; and a processor configured to obtain Morton codes indicating locations of the primitives comprised in a first space, calculate a Morton distance indicating a difference between a first Morton code corresponding to a first primitive from among the primitives comprised in the first space and a second Morton code corresponding to a second primitive from among the primitives, adjust a reference level of the acceleration structure based on the Morton distance, divide the first space by using a first division method in response to a level of a first node of the acceleration structure that corresponds to the first space being lower than the reference level, or divide the first space by using a second division method in response to the level of the first node exceeding the reference level, ray tracing from a viewpoint by casting rays into the three-dimensional scene by using the acceleration structure; and generate respective pixel values on an image plane by using results of the ray tracing.

13. The apparatus of claim 12, wherein the first division method comprises a surface area heuristic (SAH) method, and the second division method comprises a division method using the Morton codes.

14. The apparatus of claim 12, wherein the processor is further configured to divide spaces respectively corresponding to sub-nodes comprised in the first node by using the Morton codes when the level of the first node exceeds the reference level.

15. The apparatus of claim 13, wherein the processor is further configured to obtain sub-spaces comprising the first space by dividing a second space by using the SAH method.

16. The apparatus of claim 12, wherein the first primitive comprises a primitive having a smallest Morton code, and the second primitive comprises a primitive having a greatest Morton code.

17. The apparatus of claim 13, wherein the processor is further configured to decrease the reference level of the acceleration structure when the Morton distance is less than a certain threshold value and increase the reference level when the Morton distance is equal to or greater than the certain threshold value.

18. An apparatus for generating an acceleration structure for ray tracing, the apparatus comprising:

a memory configured to store information about the acceleration structure; and a processor configured:

to obtain Morton codes indicating locations of primitives comprised in a first space, to calculate a Morton distance indicating a difference between a first Morton code corresponding to a first primitive from among the primitives comprised in the first space and a second Morton code corresponding to a second primitive from among the primitives, to divide the first space into sub-spaces by using a first division method in response to the Morton distance being less than a certain threshold value, or to divide the first space into sub-spaces by using a second division method in response to the Morton distance exceeding the certain threshold value, to generate the acceleration structure by setting each sub-space as a node in the acceleration structure, ray tracing rays generated from a viewpoint to intersect a scene object by using the generated acceleration structure; and using the results from the ray tracing to determine color values of pixels for forming an image.

19. The apparatus of claim 18, wherein the first primitive comprises a primitive having a smallest Morton code, and the second primitive comprises a primitive having a greatest Morton code.

20. The apparatus of claim 18, wherein the first division method comprises a surface area heuristic (SAH) method, and the second division method comprises a division method using the Morton codes.

* * * * *